INVENTORS.
BILLY H. DAVIS
SAMUEL I. GRANT
BILLY M. MEDLEY

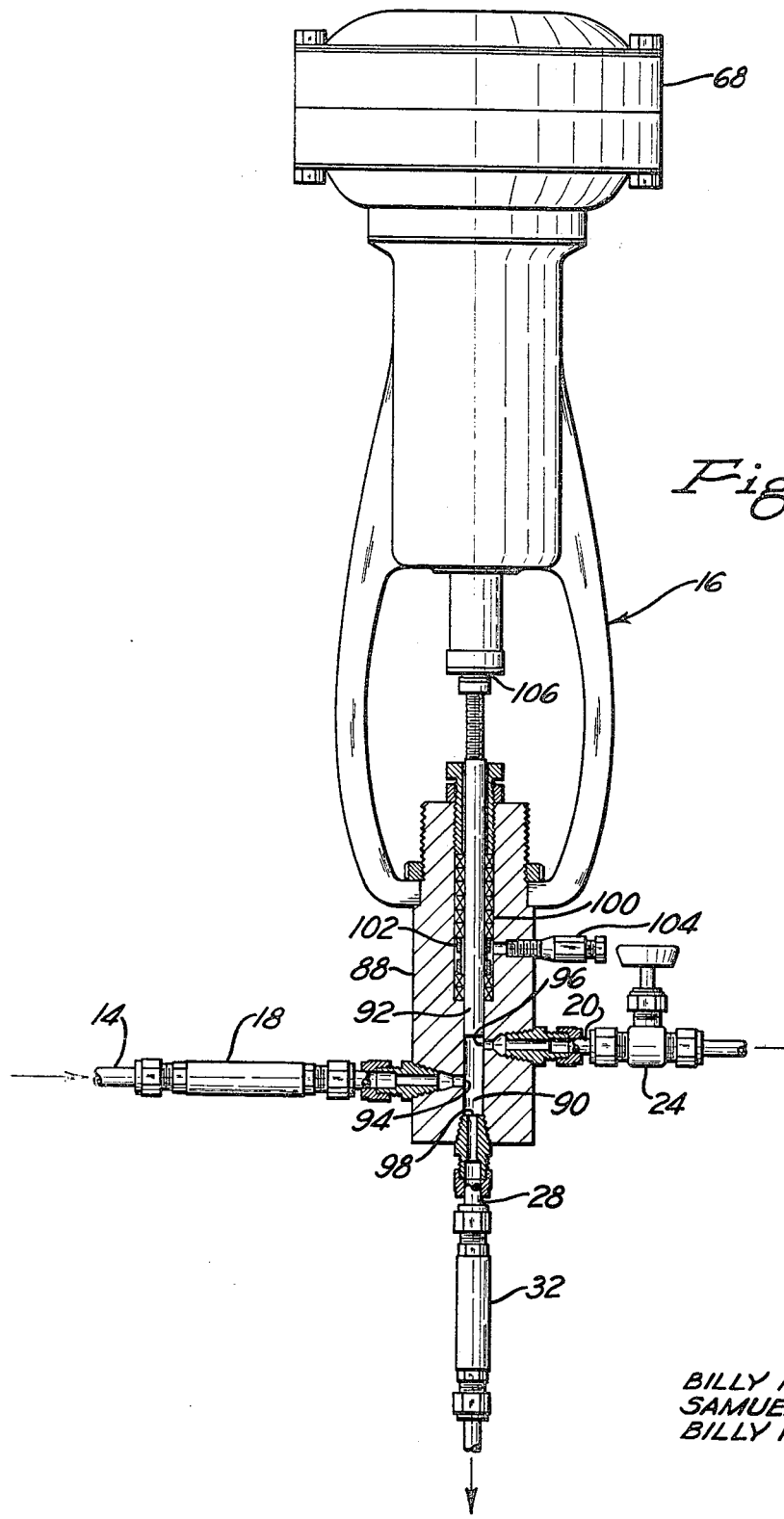

United States Patent Office 3,504,549
Patented Apr. 7, 1970

3,504,549
COMPOSITE PIPELINE SAMPLER
Billy H. Davis and Samuel I. Grant, Odessa, and Billy M. Medley, Monahans, Tex., assignors to Gulf Refining Company, Houston, Tex., a corporation of Delaware
Filed Dec. 14, 1967, Ser. No. 690,528
Int. Cl. G01n 1/14
U.S. Cl. 73—422
2 Claims

ABSTRACT OF THE DISCLOSURE

A composite sample of liquids flowing through a pipeline is obtained by installing an obstruction in the pipeline to produce a pressure drop sufficient to cause appreciable flow through a sampling line connected to the pipeline upstream and downstream of the obstruction. A sampler pump in the sampling line periodically displaces a portion of the liquid flowing through the pump into a sample collecting system maintained full of liquid and at a pressure enough higher than the pipeline pressure to prevent vaporization of volatile components of the liquid sampled.

---

Figure 1:
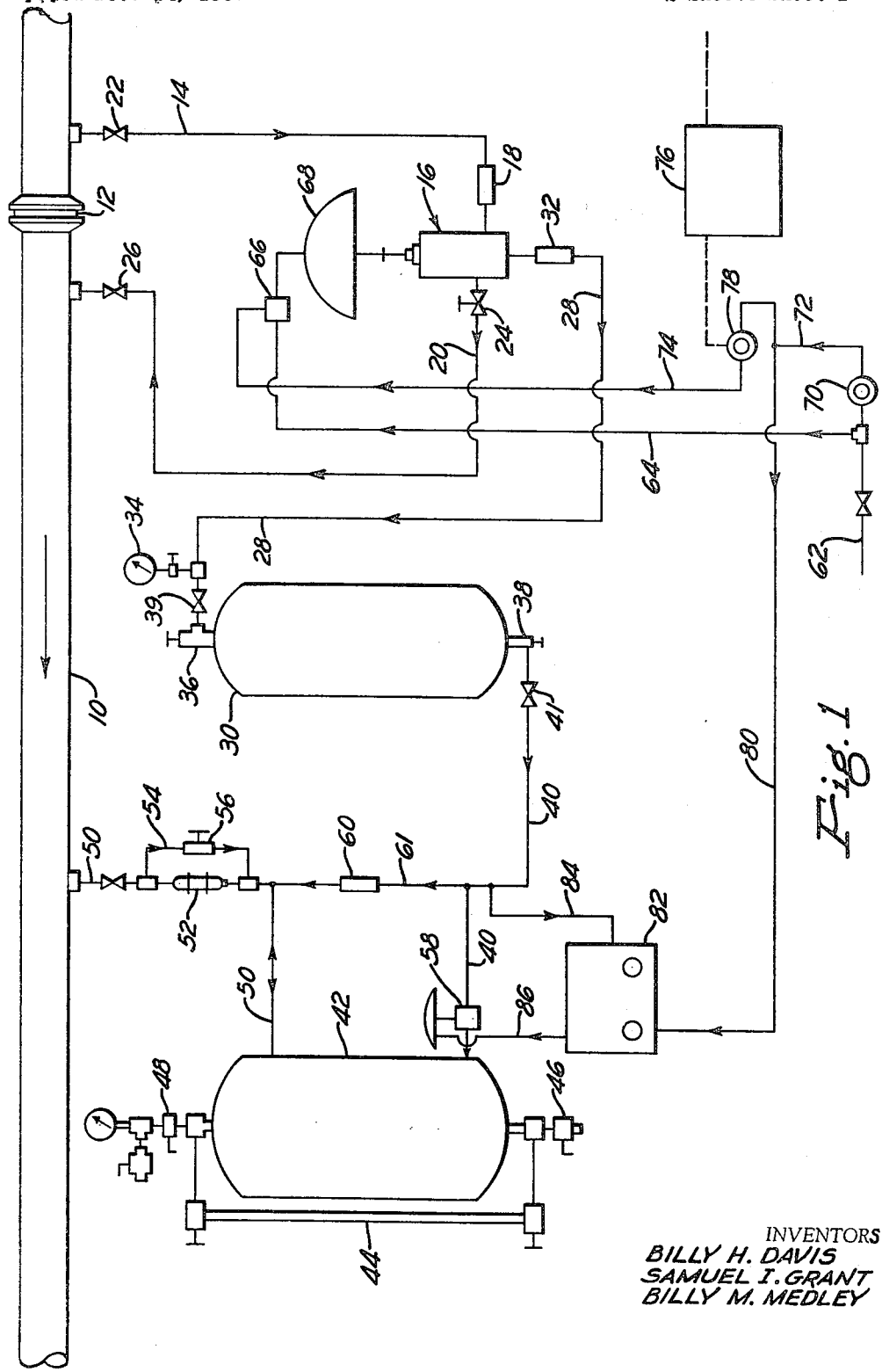

This invention relates to the sampling of liquids flowing through pipelines and more particularly to a method and apparatus for obtaining a composite sample of the pipeline liquids without alteration of the composition of the liquids as a result of vaporization of components in the sample.

Accurate measurement of petroleum hydrocarbon liquids flowing through pipelines is necessary for many purposes such as proper billing of the party receiving the liquids. To obtain the desired accuracy in the measurement, it is essential that both the volume and the composition of the liquids flowing through the pipeline be obtained. The composition is obtained by analysis of a sample of the liquids. It is contemplated that the composition of the liquids flowing through a pipeline will vary from time to time. To avoid the necessity of individual analysis of spot samples, it is desirable to obtain a composite sample that will approximate the average composition of the liquids flowing through the pipeline over a convenient period of time and analyze the composite sample.

Petroleum hydrocarbon liquids are usually a mixture of hydrocarbons of different molecular weight. Although the molecular weight of the individual hydrocarbon compounds may not vary widely, the difference in vapor pressure exerted by the individual compounds at the pipeline temperature may be substantial. Variation in vapor pressure of the individual compounds, even though the compounds do not differ substantially in molecular weight, is especially large in LPG products. If any part of the LPG mixture is allowed to vaporize, a substantial change in the composition of the liquid will occur. Hence, it is essential to maintain the sample of the pipeline liquids in the liquid phase at all times before analysis of the sample.

This invention resides in an apparatus and a method for obtaining a composite sample of pipeline liquids in which an obstruction is installed in the pipeline to produce a pressure drop adequate to cause appreciable flow through sampling apparatus connected to the pipeline and bypassing the obstruction. The flow through the sampling apparatus is substantially continuous through a sampler pump which periodically displaces a sample of the fluid into sample collecting apparatus maintained full of liquid and at a pressure higher than the pressure in the pipeline to prevent vaporization of part of the sample. Connections from the sample collecting apparatus to the pipeline are provided for movement of displacement liquid in the sample collecting apparatus as desired.

In the drawings:

FIGURE 1 is a diagrammatic flow sheet of the sampling apparatus of this invention; and FIGURE 2 is an elevational view, partially in vertical section, of the sampler pump used to transfer the sample from the stream bypassing the obstruction to the sample collecting apparatus.

Referring to FIGURE 1, the pipeline from which the sample is to be collected is indicated by reference numeral 10. An orifice plate 12 installed in the pipeline creates an obstuction to flow through the pipeline and thereby provides a pressure differential in the pipeline adequate to maintain flow through the sampling apparatus. An inlet line 14 tapped into the pipeline 10 upstream from the orifice plate 12 is connected to the inlet of a sampler pump indicated generally by reference numeral 16. A check valve 18 in inlet line 14 permits flow in the direction from the pipeline to the sampler pump. A return line 20 is connected to the outlet of the sampler pump 16 and is tapped into the pipeline 10 downstream from orifice 12. Inlet line 14 is provided with a valve 22, and outlet line 20 is provided with valves 24 and 26 as desired for maintenance and operation of the apparatus.

A sample line 28 extends from the lower end of the sampler pump to the upper end of a sample bomb 30. A check valve 32 in sample line 28 allows flow only in the direction from the sampler pump 16 to the sample bomb 30. A pressure gauge 34 connected in line 28 allows observation of the pressure in the sample collecting system.

Sample bomb 30 is a standard ICC approved type of sample container having a valve 36 at its top and a valve 38 at its bottom. Valves 39 and 41 in lines to and from the sample bomb allow the lines to be closed when the sample bomb is removed. The volume of the sample bomb 30 should be larger than the volume of the composite sample that is to be collected for the analysis. Ordinarily a sample bomb of 5 gallon capacity is adequate.

A displacement liquid line 40 connected to valve 38 at the bottom of the sample bomb extends to a displacement liquid reservoir 42 equipped with a sight glass 44 to allow determination of the size of the sample that has been collected. Valves 46 and 48 are provided at the lower and upper ends of the reservoir. Reservoir 42 preferably has a volume larger than the volume of the sample bomb 30.

A discharge line 50 from the upper end of the displacement liquid reservoir 42 is connected into the pipeline 10 downstream from orifice 12. A check valve 52 in discharge line 50 permits flow only in the direction from the reservoir 42 into the pipeline 10. At times it is desirable to use the pressure in the pipeline 10 to force displacement liquid from the reservoir 42 into sample bomb 30 to fill the bomb with displacement liquid before sampling begins. For this reason a bypass line 54 is provided around check valve 52. Bypass line 54 is closed by a valve 56 during normal operation of the sampling apparatus.

The pressure in the sample bomb 30 is maintained above the pressure in the pipeline by a pressure control valve 58 in displacement liquid line 40 that controls flow through that line into the reservoir 42. Excessive pressure in the sample bomb 30 and line 40 is prevented by a pressure release valve 60 in line 61 connecting line 40 with discharge line 50.

In the apparatus illustrated in FIGURE 1, pressure control valve 58 and sampler pump 16 are actuated by compressed air. The compressed air, from a source not shown, is delivered through lines 62 and 64 to an air volume booster 66 and then into the motor portion 68 of sampler pump 16. Another portion of the compressed air is delivered through a pressure regulator 70, a line 72 and a line 74 to the air volume booster. An electric timer 76 operates a valve 78 to control flow through line 74 to the air volume booster 66.

An air supply line 80 extends from line 72 to a controller 82 connected through a line 84 to the displacement liquid line 40 and through a line 86 to pressure control valve 58. Controller 82 actuates pressure control valve 58 to maintain the desired pressure in line 40.

Referring to FIGURE 2 of the drawings, the sampler pump 16 comprises a housing 88 having a cylinder 90 extending longitudinally therethrough. A plunger 92, slidable in the cylinder, is illustrated in FIGURE 2 in its normal, withdrawn position. An inlet port 94 opens through the side of housing 88 into the cylinder 90 near its lower end. Inlet line 14 is connected to the sampler pump 16 to communicate with inlet port 94. An outlet port 96 opens through the side of the housing 88 and communicates with the cylinder 90 just below the lower end of plunger 92 when the plunger is in its normal position illustrated in FIGURE 2. Return line 20 is connected into outlet port 96.

The lower end of cylinder 90 is enlarged to form a sample port 98 into which sample line 28 is connected. Check valve 32 in the sample line 28 permits flow only in the direction from the sampler to the sample collecting apparatus.

The longitudinal opening that forms cylinder 90 in housing 88 is enlarged at its upper end to form a packing gland 100 through which the plunger 92 extends upwardly for connection to the motor portion 68 of the sampler pump. Lubrication of the packing gland is accomplished by a lantern ring 102 provided with a suitable lubricator 104. Plunger 92 extends upwardly through the packing gland. The upper end of the plunger 92 is threaded for connection to a shaft 106 that extends upwardly into motor 68. Motor 68 can be of a conventional type in which compressed air acting on a diaphragm overcomes a spring to move the plunger downward and the spring returns the plunger to the normal position when the air pressure is released.

In the operation of the sampling apparatus, the sample bomb 30 is connected to displacement liquid line 40. Bypass valve 56 is opened to permit hydrocarbon liquids from pipeline 10 to enter the upper end of reservoir 42 and displace displacement liquid from reservoir 42, through line 40 and into sample bomb 30. When the sample bomb 30 is filled with displacement liquid, sample line 28 is connected to valve 36, bypass valve 56 is closed, and the apparatus is in condition for sampling liquids flowing through the pipeline 10. Pipeline liquids enter inlet line 14, flow through check valve 18, and enter sampler pump 16. Sampler pump 16 is in the normal position illustrated in FIGURE 2 with the plunger withdrawn to allow flow through the cylinder 90 to the outlet port 96 and then through return line 20. The pipeline liquids flow through return line 20 to the pipeline downstream of the orifice.

Periodically electric timer 76 opens valve 78 to allow flow of compressed air through line 74 into the air volume booster. The booster is thereby actuated to permit flow of air into sampler pump motor 68 which moves the plunger 92 downwardly to the forward position adjacent sample port 98. As the plunger moves downwardly, it covers outlet port 96 to prevent flow into the return line. The increase in pressure caused by downward movement of the plunger closes check valve 18 and displaces liquid in the cylinder 90 through sample port 98 and check valve 32 into the sample collecting apparatus. The timer 76 is provided with a delay circuit which allows the air motor to complete a full stroke of the pump plunger 92 before releasing the air to cause resetting of the pump to the normal position.

The sample displaced from the pump moves through line 28 into the upper end of sample bomb 30 and displaces the displacing liquid from the sample bomb into reservoir 42. A preferred displacement liquid is an aqueous solution comprising 50 percent water and 50 percent glycol, but any liquid in which the pipeline liquids are virtually insoluble can be used. Pressure controller 58 restricts flow through line 40 into reservoir 42 to maintain the pressure in sample bomb 30 high enough to prevent vaporization of the more volatile components of the sample. The pressure maintained in sample bomb 30 will depend upon the composition of the liquids in pipeline 10 and the temperature of the liquids. In a typical installation in which the liquid flowing through pipeline 10 is LPG containing propane, butane, and some heavier hydrocarbons, control valve 58 can be set to maintain a pressure of 600 p.s.i. in sample bomb 30. As collection of the sample continues, displacement liquid entering reservoir 42 through line 40 displaces hydrocarbons in the upper portion of the reservoir through line 50 and check valve 52 into pipeline 10. Check valve 52 is typically set to maintain the pressure in the reservoir 42 approximately 10 pounds per square inch higher than the pipeline pressure. The amount of the sample collected can be determined at any instant from the change in level of liquid in sight glass 44. After the desired volume of sample has been collected, timer 76 is inactivated, valves 36, 38, 39 and 41 are closed, and sample bomb 30 is removed. Another sample bomb is connected to lines 28 and 40, timer 76 is reactivated, and the procedure repeated.

This invention provides a method and apparatus for obtaining a composite sample of pipeline liquids that is truly representative of the pipeline liquids. The unique sampler pump increases the pressure on the sample to a pressure high enough to preclude vaporization of the most volatile components of the liquids.

We claim:

1. Apparatus for obtaining a composite sample of liquids flowing through a pipeline having obstruction means within the pipeline for increasing the pressure drop in the pipeline comprising a sampler pump, an inlet line opening into the pipeline upstream of the obstruction and connected to the sampler pump for delivery of liquids thereto, a return line from the sampler pump opening into the pipeline downstream of the obstruction for return of liquids from the sampler pump to the pipeline, a sample bomb, a sample line from the sampler pump to the sample bomb, a displacement liquid reservoir, a displacement liquid line from the sample bomb to the displacement liquid reservoir, said sample bomb being detachably connected to the sample line and displacement liquid line, a discharge line from the displacement liquid reservoir to the pipeline downstream of the obstruction, a check valve in the discharge line permitting flow only from the displacement liquid reservoir to the pipeline, a bypass line around the check valve in the discharge line, and a bypass valve in the bypass line whereby pipeline fluids can be delivered into the displacement liquid reservoir through the discharge line to displace displacement liquid from the displacement liquid reservoir into the sample bomb, and timer-actuated driving means operating the sampler pump adapted to hold the sampler pump in a normal position in which pipleine liquids flow through the sampler pump from the inlet line to the return line and periodically move the pump to a sample position discharging fluids through the sample line to displace liquid within the sampler pump through the sample line to the sample bomb.

2. Apparatus for obtaining a composite sample of liquids flowing through a pipeline having obstruction means within the pipeline for increasing the pressure drop in the pipeline comprising a sampler pump, an inlet line opening into the pipeline upstream of the obstruction and connected to the sampler pump for delivery of liquids thereto, a return line from the sampler pump opening into the pipeline downstream of the obstruction for return of liquids from the sampler pump to the pipeline, a sample bomb, a sample line from the sampler pump to the sample bomb, a displacement liquid reservoir, a displacement liquid line from the sample bomb to the displacement liquid reservoir, a discharge line from the displacement liquid reservoir to the pipeline downstream of the obstruction, a check valve in the discharge line permitting flow only from the displacement liquid reservoir to the pipeline, a pressure control valve in the displacement liquid line, said pressure control valve being adapted to maintain the pressure in the sample bomb higher than the pressure in the pipeline, and timer-actuated driving means operating the sampler pump adapted to hold the sampler pump in a normal position in which pipeline liquids flow through the sampler pump from the inlet line to the return line and periodically move the pump to a sample position discharging fluids through the sample line to displace liquid within the sampler pump through the sample line to the sample bomb.

References Cited

UNITED STATES PATENTS

| | | | |
|---|---|---|---|
| 2,608,866 | 9/1952 | Breedlove et al. | 73—422 |
| 3,090,323 | 5/1963 | Smith | 73—422 |
| 3,321,977 | 5/1967 | Topham | 73—422 |
| 2,284,560 | 5/1942 | Corneil. | |

LOUIS R. PRINCE, Primary Examiner

H. C. POST III, Assistant Examiner

U.S. Cl. X.R.

73—422